(12) United States Patent
Tatourian et al.

(10) Patent No.: US 11,952,003 B2
(45) Date of Patent: *Apr. 9, 2024

(54) COMPUTER-ASSISTED DRIVING METHOD AND APPARATUS INCLUDING AUTOMATIC MITIGATION OF POTENTIAL EMERGENCY

(71) Applicant: Mobileye Vision Technologies Ltd., Jerusalem (IL)

(72) Inventors: Igor Tatourian, Fountain Hill, AZ (US); Hassnaa Moustafa, San Jose, CA (US); David Zage, Livermore, CA (US)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/077,110

(22) Filed: Dec. 7, 2022

(65) Prior Publication Data

US 2023/0115857 A1 Apr. 13, 2023

Related U.S. Application Data

(63) Continuation of application No. 16/391,032, filed on Apr. 22, 2019, now Pat. No. 11,524,697.

(51) Int. Cl.
*B60W 50/12* (2012.01)
*B60W 30/09* (2012.01)
*B60W 30/095* (2012.01)
*G05D 1/00* (2006.01)

(52) U.S. Cl.
CPC ............ *B60W 50/12* (2013.01); *B60W 30/09* (2013.01); *B60W 30/0953* (2013.01); *G05D 1/0061* (2013.01); *G05D 2201/0213* (2013.01)

(58) Field of Classification Search
CPC .. B60W 50/12; B60W 30/09; B60W 30/0953; B60W 30/0956; B60W 60/007; G05D 1/0061; G05D 2201/0213
See application file for complete search history.

(56) References Cited

U.S. PATENT DOCUMENTS

| | | | |
|---|---|---|---|
| 2012/0083947 A1* | 4/2012 | Anderson | G08G 1/165 701/1 |
| 2019/0235499 A1* | 8/2019 | Kazemi | G01S 17/931 |
| 2020/0189575 A1* | 6/2020 | Wongpiromsarn | G08G 1/166 |
| 2020/0216090 A1* | 7/2020 | Zaseck | B60W 30/0953 |

FOREIGN PATENT DOCUMENTS

EP 2208654 A1 * 7/2010 ............ B60W 30/09

* cited by examiner

*Primary Examiner* — Faris S Almatrahi
*Assistant Examiner* — Sahar Motazedi
(74) *Attorney, Agent, or Firm* — FINNEGAN, HENDERSON, FARABOW, GARRETT & DUNNER LLP

(57) ABSTRACT

Apparatuses, storage media and methods associated with computer assisted driving (CAD), are disclosed herein. In some embodiments, an apparatus includes an autopilot engine to automatically pilot the vehicle out of a potential emergency situation, including to automatically pilot the vehicle for a period of time in view of a plurality of operational guardrails determined in real time for each of a plurality of timing windows; and a mitigation unit to conditionally activate the autopilot engine, including to activate the autopilot engine in response to analysis results indicative of the vehicle being potentially operated into the emergency situation manually. Other embodiments are also described and claimed.

17 Claims, 11 Drawing Sheets

COMPUTER-ASSISTED DRIVING METHOD AND APPARATUS INCLUDING AUTOMATIC MITIGATION OF POTENTIAL EMERGENCY

RELATED APPLICATIONS

The present application is a continuation of U.S. application Ser. No. 16/391,032, filed on Apr. 22, 2019, the contents of which is hereby incorporated by reference herein in its entirety and for all purposes.

TECHNICAL FIELD

The present disclosure relates to the field of computer-assisted driving (CAD). More particularly, the present disclosure relates to method and apparatus for CAD, including automatic mitigation of a potential emergency by advanced driving assistance systems (ADAS).

BACKGROUND

With advances in integrated circuits, sensors, computing and related technologies, increasingly, more and more operations of a vehicle can receive computer assistance, from parallel parking, to lane changing, and so forth. Progressive mode autonomous driving allows vehicles to have an autopilot mode (L2-L3) that enables autonomous driving, mainly on highways, when requested. This mode, on manual invocation, takes care of automated lane maintenance, lane changing, speed control, and breaking while a human driver maintains hands on the steering wheel. Typically, the human driver starts the autopilot mode before the vehicle starts the route (e.g., as the vehicle enters the highway, the human driver enables the autopilot mode). As triggering the autopilot mode for L2-L3 vehicles today happens based on human choice, there are scenarios where the capabilities of the autopilot mode are not used, e.g., the human driver would prefer driving (e.g., drivers who enjoy driving, drivers with motion sickness, or passengers who are not comfortable with/used to the autopilot mode and request the driver to stay in control). Accordingly, the potential benefits of autopilot mode of these L2-L3 vehicles may not be fully realized.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
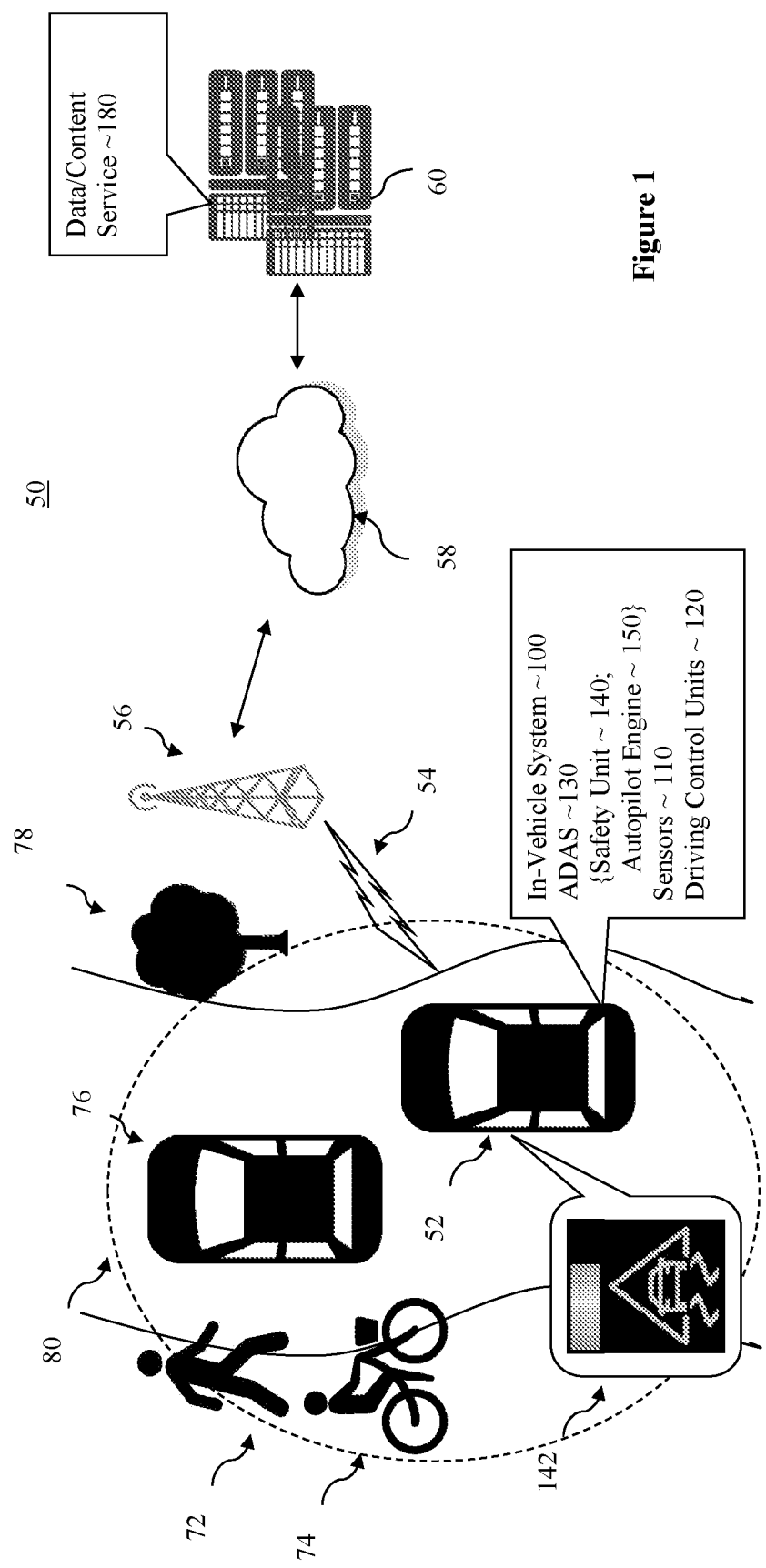
FIG. 1 illustrates an overview of an environment for incorporating and using the CAD driving technology of the present disclosure that includes automatic mitigation of a potential emergency.

Many emergency situations are caused by environmental conditions and/or human drivers operating vehicles inappropriately, e.g., many accidents caused by human drivers on highways are a result of the vehicle drifting to the side of the highway due to speeding or incorrectly entering a turn, visibility problems, weather conditions, lapses in concentration, or incapacitation. Many of these potential emergency situations are preventable or mitigatable using automation. In this disclosure, a safety unit and an autopilot engine are provided to an ADAS of a vehicle to enforce proper control against improper operation of a vehicle for a L2-L3-enabled vehicle when the human is in control. For example, the present disclosure can be used to prevent run-off-road crashes, where a driver loses control of a car and a car goes off the road. A variety of reasons causes such run-off or fly-off accidents. These include excessive speed into a turn coupled with ice on the road, wheel slippage, unexpected obstacles in the path of the vehicle, lift-off oversteer, driver over-reaction, and so forth.

In various embodiments, an apparatus for CAD is provided with an autopilot engine and a mitigation unit. The autopilot engine is disposed in a vehicle to automatically pilot the vehicle out of a potential emergency situation. In particular, to automatically pilot the vehicle out of the potential emergency situation includes to automatically pilot the vehicle for a period of time in view of a plurality of operational guardrails determined in real time for each of a plurality of timing windows. Similarly, the mitigation unit is disposed in the vehicle and coupled to the autopilot engine to conditionally activate the autopilot engine. In particular, to conditionally activate the autopilot engine includes to activate the autopilot engine in response to analysis results indicative of the vehicle being potentially operated into the emergency situation manually.

In various embodiments, a method for computer-assisted driving includes: receiving, by a driving assistance system (DAS) of a vehicle, analysis results indicating of a potentiality of the vehicle being manually operated into an emergency situation, in excess of a threshold; automatic piloting, by the DAS unit, to prevent the vehicle from being operated manually into the emergency situation; and countering, disengaging, or disabling, by the DAS, manual operation of the vehicle, while the vehicle is momentarily being automatically piloted.

In various embodiments, at least one computer-readable medium (CRM) are provided with instructions. The instructions are arranged to cause a driving assistance system (DAS) of a vehicle, in response to execution of the instruction by the DAS, to: determine one or more operational guardrails, based at least in part on dynamics of the vehicle determined in real time; and automatically pilot the vehicle for a period of time, in view of the one or more operational guardrails determined, to head off the vehicle from being operated manually into an emergency situation.

In the following detailed description, these and other aspects of the CAD technology with mitigation of potential emergency will be further described. References will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" or "engine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the CAD technology of the present disclosure, with mitigation of potential emergency, in accordance with various embodiments, is illustrated. As shown, for the illustrated embodiments, example environment 50 includes moving vehicle 52 having ADAS 130 incorporated with the CAD technology of the present disclosure, e.g., with mitigation of potential emergency, enroutes to a destination. As vehicle 52 drives on a roadway, which may be an alley, a street, a boulevard, or a highway, the roadway may be straight or curvy. The road surface condition may be dry and good, or slippery, e.g., wet or icy due to current or recent past precipitations, rainfall or snow. The visibility may be good or poor due to heavy precipitation or fog. Additionally, in its surrounding area 80, there may be other vehicles, e.g., vehicle 76, pedestrian 72, bicyclist 74, objects, such as tree 78 or road signs (not shown).

Vehicle 52 may be operated manually by a human driver. Due to poor driving conditions and/or inattentive/inappropriate operation by the driver, e.g., the driver is sleepy, tired, speeding and so forth, vehicle 52 may be manually operated into a potential emergency situation, e.g., a serious, unexpected, and often dangerous situation, requiring immediate action. Examples of such emergency situations may include, but are not limited to, slipping off the roadway, and/or hitting a nearby vehicle, a pedestrian, a bicyclist, a tree, a road sign, and so forth. ADAS 130, with the incorporated technology of the present disclosure, is arranged to detect the impending potential emergency situation, and automatically take over piloting of vehicle 52 for a period of time, to prevent vehicle 52 from being manually operated into the potential emergency situation. ADAS 130 hereafter may also be simply referred to as driving assistance systems (DAS).

In various embodiments, ADAS 130, with CAD technology including mitigation of potential emergency, includes safety unit 140 and autopilot engine 150, arranged in accordance with the teachings of the present disclosure. Safety unit 140 is arranged to detect whether vehicle 52 is about to be manually operated into a potential emergency situation. On detection of vehicle 52 being about to be manually operated into a potential emergency situation, safety unit 140 invokes autopilot engine 140 to automatically take over piloting of vehicle 52 for a period of time, to prevent vehicle 52 from being manually operated into the potential emergency situation.

In various embodiments, safety unit 140 is arranged to detect whether vehicle 52 is being about to be manually operated into a potential emergency situation based at least in part on sensor data provided by sensors 110 of vehicle 52 (e.g, sensor data associated with the determination of vehicle motion dynamics and traction with the road), and/or environmental condition data provided by remote server(s) 60, nearby vehicles (e.g., vehicle 76), roadside units (not shown), and/or personal systems worn by pedestrian 72/bicyclist 74. Safety unit 140 analyzes these data to determine whether vehicle 52 is being manually operated in compliance with various safe driving policies and predicts if current vehicle motion may cause a dangerous situation or accident in the next t-seconds, e.g., whether vehicle 52 would crash off-road. In various embodiments, safety unit 140 may perform the computation ignoring other vehicles and objects on the road and only predicts if its own vehicle dynamics are safe. Further, the computation may be done independently and in parallel to other ADAS functions. In various embodiments, the prediction may be communicated to the driver via the cluster dashboard of vehicle 52.

In various embodiments, safety unit 140 is further arranged to counter, disengage or disable manual operation of vehicle 52, on invocation of autopilot 150 to automatically pilot vehicle 52 for a period of time to prevent/avoid occurrence of the emergency situation. Counter, disengage or disable manual operations may include counter, disengage or disable manual steering, acceleration and/or braking of vehicle 52.

In various embodiments, safety unit 140 is further arranged to provide audio, visual and/or mechanical alerts to the driver, informing the driver of vehicle 52 of the assessment of ADAS 130 with respect to the potentiality of vehicle 52 being manually operated into an emergency situation. Examples of audio alerts may include, but are not limited to, a sharp or loud beeping tone or an audio warning message. The volume of the tone may be proportional to the imminence of emergency as assessed by ADAS 130. Examples of visual alerts may include but are not limited to any visual displays and/or messages. Similarly, the visual alerts may also convey the degree of imminence of the emergency as assessed by ADAS 130. In various embodiments, visual alerts include in particular, fear indicator 142, to be further described later with reference to FIG. 2. Examples of mechanical alerts may include, but are not limited to, vibration of the steering wheel, vibration of the driver seat, and so forth. Likewise, the amount of vibrations may be reflective of the degree of imminence of the emergency as assessed by ADAS 130.

In various embodiments, in addition to ADAS 130, vehicle 52 includes an engine, transmission, axles, wheels and so forth (not shown). Further, for the illustrated embodiments, vehicle 52 includes in-vehicle system (IVS) 100, sensors 110, and driving control units (DCU) 120. Additionally, IVS 100 may include navigation subsystem (not shown) configured to provide navigation guidance. ADAS 130 is configured with computer vision to recognize stationary or moving objects (such as tree 78, moving vehicle 76, bicyclist 74 and pedestrian 72) in surrounding area 80. In various embodiments, ADAS 130 is configured to recognize these stationary or moving objects in area 80 surrounding CA/AD vehicle 52, and in response, make its decision in controlling DCUs 120 of vehicle 52.

Sensors 110 include in particular one or more cameras (not shown) to capture images of surrounding area 80 of vehicle 52. In various embodiments, sensors 110 may also include other sensors, such as light detection and ranging (LiDAR) sensors, accelerometers, inertial units, gyroscopes, global positioning system (GPS) circuitry, pressure sensors, and so forth. These other sensors may collect a wide range sensor data about vehicle 52, including but are not limited to, inertial data of the vehicle, amount of frictions at the corresponding points where tires of the vehicle contact the road surface, weight distribution of the vehicle, and so forth. Examples of driving control units (DCU) 120 may include control units for controlling engine, transmission, brakes of CA/AD vehicle 52. In various embodiments, IVS 100 may further include a number of infotainment subsystems/applications, e.g., instrument cluster subsystem/applications, front-seat infotainment subsystem/application, such as, a navigation subsystem/application, a media subsystem/application, a vehicle status subsystem/application and so forth, and a number of rear seat entertainment subsystems/applications (not shown).

In various embodiments, IVS 100 and ADAS 130, on their own or in response to user interactions, communicate or interact 54 with one or more remote/cloud servers 60, nearby vehicles, e.g., vehicle 76, and/or nearby personal systems, e.g., personal systems worn by pedestrian 72/bicyclist 74. In particular, in various embodiments, remote/cloud servers 60 include data/content services 180. Examples of data/content provided by data/content service 180 may include, but are not limited, road and/or weather conditions of various roadways at various points in time. The data/content may be gathered by service 180 and/or received from various third parties, e.g., reported by other vehicles 76 traveling through those road segments. Service 80 may compile, aggregate, condense, summarize, the gathered/received data, as well as extrapolate and/or provide projections based on the gathered/received data. Similarly, IVS 100 and/or ADAS 130 may receive data/contents, in particular, weather/environmental data, from systems on nearby vehicle 76 and/or personal systems worn by pedestrian 72/bicyclist 76.

In various embodiments, IVS 100 and ADAS 130 may communicate 54 with server 60 via cellular communication, e.g., via a wireless signal repeater or base station on transmission tower 56 near vehicle 52, and one or more private and/or public wired and/or wireless networks 58. Examples of private and/or public wired and/or wireless networks 58 may include the Internet, the network of a cellular service provider, and so forth. It is to be understood that surrounding area 80 and transmission tower 56 may be different areas and towers at different times/locations, as vehicle 52 travels enroute to its destination. In various embodiments, ADAS 130 may be equipped to communicate with other vehicles 76 and/or personal systems worn by pedestrian 72/bicyclist 74 directly via WiFi or dedicated short range communication (DSRC) in accordance with selected inter-vehicle or near field communication protocols.

Except for the technology of the present disclosure provided, ADAS 130, IVS 100 and vehicle 52 otherwise may be any one of a number of ADAS, IVS and CAD vehicles known in the art. The emergency mitigation technology and related aspects of ADAS 130 will be further described with references to the remaining Figures. Before doing so, it should be noted that, while for ease of understanding, only one other vehicle 76, one object tree 78, one pedestrian 72 and one bicyclist 74 are illustrated, the present disclosure is not so limited. In practice, there may be multitude of other vehicles 76, objects 78, pedestrians 72 and bicyclist 74 in surrounding area 80. Further, the shape and size of surrounding area 80 considered may vary from implementation to implementation.

Figure 2:
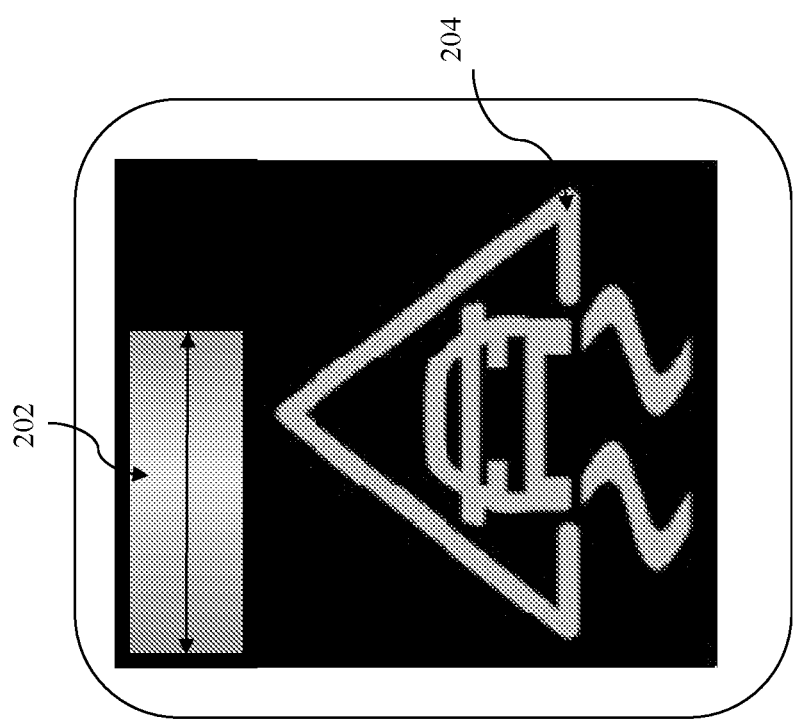
FIG. 2 illustrates the example visual alert of FIG. 1 in further detail.

Referring now to FIG. 2, wherein the example visual alert of FIG. 1 is illustrated in further detail, according to various embodiments, is illustrated. As shown, for the illustrated embodiments, the visual alerts include a fear indictor 200 the reflects the assessment of ADAS 130 with respect to the potentiality of vehicle 52 is being manually operated into an emergency situation. Fear indictor 200 includes a spectrum 202 of potentiality, and an indicator 204 pointing to a point on spectrum 202 to reflect the current assessment of ADAS 130. In various embodiments, spectrum 202 is colored, e.g., spanning from dark green, indicative of low potentiality, to light green then light yellow, indicative of various medium potentiality, then dark yellow to orange and red, indicative of various higher and higher potentiality. In FIG. 2, the different colors are correspondingly depicted by different shades of gray. For the illustrated embodiments, a triangle have a sliding vehicle is used as pointer 204 to point to a location on spectrum 202 to denote the current assessment of potentiality of the vehicle being manually operated into an emergency. In alternate embodiments, other graphical elements may be used to visually convey the potentiality assessment. In various embodiments, this fear indicator conveys how confident ADAS 130 is, on its computation and prediction whether the vehicle can recover in case a driver loses control. In various embodiments, the computation that predicts vehicle dynamics for the next t-seconds based on vector of motion, road traction, road curvature and width, and other environmental parameters, will not only suggest that risk of accident is high or low, but will also display recommended safe operating parameters including but are not limited to, speed, lane selection, time to destination if driving as the vehicle is operated now versus driving as suggested.

Figure 3:
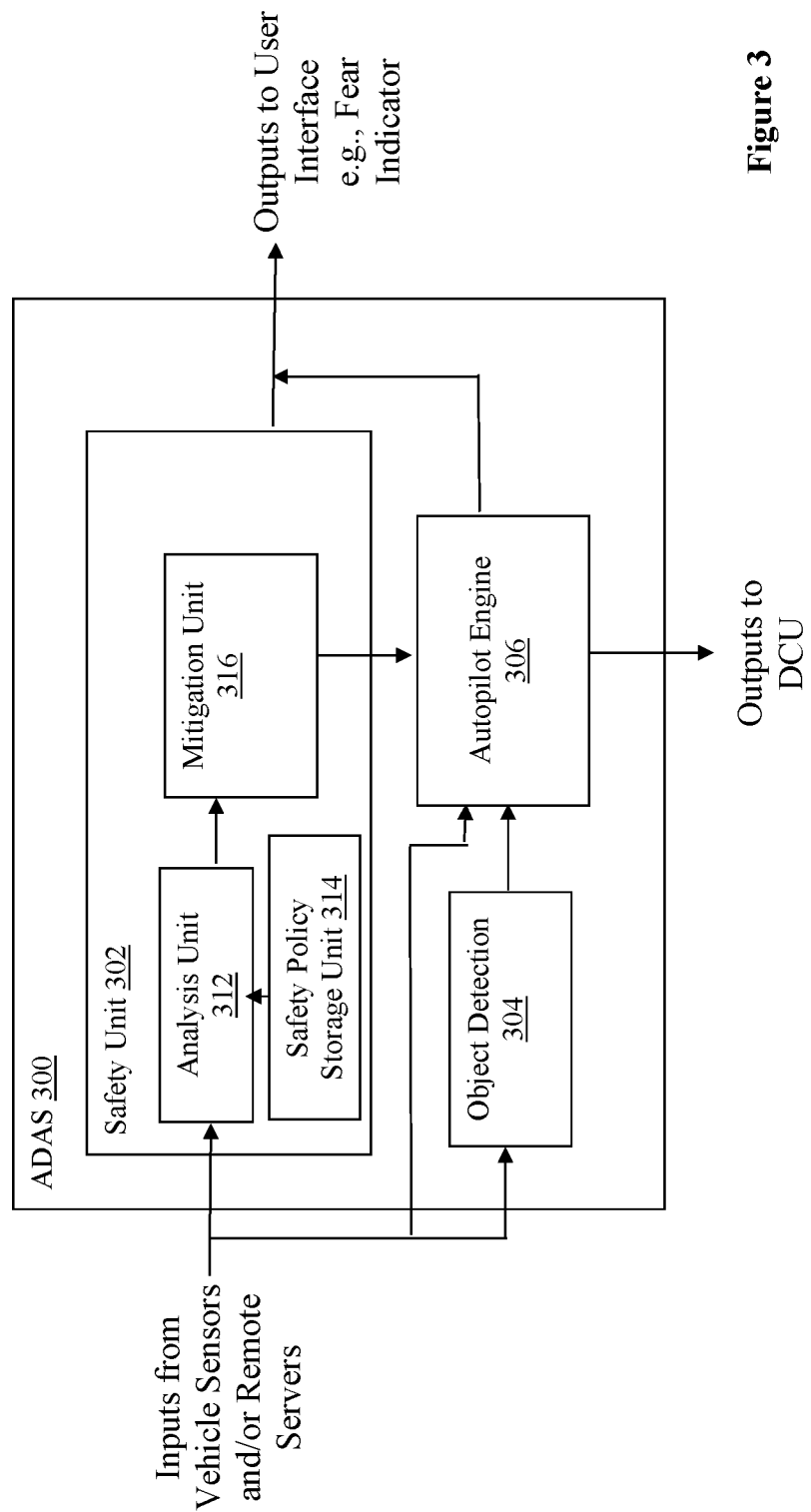
FIG. 3 illustrates a component view of an example ADAS.

Referring now FIG. 3, wherein a component view of an example ADAS, according to various embodiments, is illustrated. As shown, for the illustrated embodiments, ADAS 300, which may be ADAS 130 of FIG. 1, includes safety unit 302, autopilot engine 306, and object detection unit 304, coupled to each other as shown. Safety unit 302 includes analysis unit 312, safety policy storage unit 314 and mitigation unit 316. Safety unit 302 and autopilot engine 306 may be safety unit 140 and autopilot engine 150 of FIG. 1.

Safety policy storage unit 314 is arranged to store a plurality of safe driving policies. In various embodiments, safe driving policies are defined as exclusions, e.g., defining the unsafe rules in terms of irregular driving behavior and other human-related constraints due to age, sex, and driving preferences (sporty, sight-seeing, other). Examples of unsafe rules related to vehicle dynamics may include, but are not limited to, driving in excess of speed limits (speeding), frequent changes/corrections to driving direction in excess of a threshold relative to the curvature of the roadway (swirling), road traction coefficients, and so forth. In various embodiments, safety policy storage unit 314 may be implemented with any one of a number of storage devices know in the art, including but are not limited to, non-volatile memory, solid state drives, optical or magnetic disk drives, and so forth.

Analysis unit 312 is arranged to receive as inputs, sensor data from various sensors of the vehicle, and environmental condition data of the roadway from remote servers or nearby vehicles, pedestrians, bicyclists or roadside units. ADAS 300 may further include appropriate communication interfaces, such as serial interfaces, like universal serial bus (USB), peripheral controller interface (PCI), and so forth (not shown), to receive these data from the sensors of the vehicles, and WiFi, 5G or nearfield communication interfaces (not shown), to receive sensor data from the remote servers/nearby vehicles/pedestrians/bicyclists/roadside units. Analysis unit 312 analyzes these sensor data against the stored safe driving policies to determine whether there are any violations of the safe driving policies.

In various embodiments, analysis unit 312 is arranged to use dynamic data from inertial sensors in the vehicle wheels to detect the acceleration, the angular rate, and the elevation angles at time t, traction with the road and slippage and calculate an inertial vector (IV) of the vehicle through the difference between the inertia data at time t+u, and the inertia data at time t. U is a small increment in time, e.g., 0.001 of a second. U may vary from implementation to implementation, depending on the precision and/or responsiveness desired. Further, analysis unit 312 is arranged to use image data from the camera sensors, and calculate a motion vector (MV) of the vehicle, between each pair of consecutive images (at time t and t+u). In various embodiments, analysis unit 312 may be arranged to consider the areas surrounding the four corners of the vehicle as region of interest (ROIs) when calculating the MV. Still further, analysis unit 312 is arranged to correlate the MV with the IV with time sync to identify potential deviation of the vehicle from the roadway. If the results of the analysis indicate no unsafe driving rule is satisfied, analysis unit 312 repeats the analysis for the next quantum of time. However, if the results of the analysis indicate at least one unsafe driving rule is satisfied, the results of the analysis, e.g., the assessments of analysis unit 312, is provided to mitigation unit 316. In various embodiments, the assessment of analysis unit 312 provided includes the amplitude of each deviation, and at least the sensor data from the camera sensors.

In various embodiments, mitigation unit 316 is arranged to determine a level of danger the vehicle is in, based at least in part on the analysis results/assessments of analysis unit 312. Mitigation unit 316 is arranged to detect a scene status (e.g., normal driving condition, snowing, high-wall edge is appearing, and so forth), using the sensor data from the camera sensors as well as data received from the cloud or from other vehicles via V2V. Mitigation unit 316 then determines a danger level based at least in part on the detected scene and the amplitude of each deviation.

In various embodiments, on determining a low danger level, mitigation unit 316 sends out one or more audio, visual or mechanical alerts to the driver to alert the driver of the potential danger/emergency situation, e.g., the fear indicator earlier described with reference to FIG. 2. In various embodiments, for low danger level, mitigation unit 316 does not counter, disengage, nor disable human operation of the vehicle. On the other hand, on determining a high danger level, mitigation unit 316 invokes autopilot engine 306 to take over and autopilot the vehicle for a moment to prevent the vehicle from actually being manually operated into the emergency situation. In various embodiments, mitigation unit 316 further increases the intensity of the one or more audio, visual or mechanical alerts it sends to the driver. In various embodiments, for high danger level, mitigation unit 316 further counter, disengage or disable human operations of the vehicle, e.g., by countering, disengaging or disabling steering, accelerating or braking of the vehicle. In various embodiments, mitigation unit 316 may counter, disengage or disable human operation of the vehicle by issuing commands to the DCUs of the vehicle, directly or through autopilot engine 306. In various embodiments, driver disengagement corresponds with the clear notification in the dashboard (cluster) display that the vehicle took over in order to avoid a possible accident. Such disengagement is expected to last for a very brief time to slow down and stabilize the vehicle along the road or a highway where the vector of motion will be oriented parallel to the side of the road. In other embodiments, this functionality can be disabled to allow manual-only control of the vehicle if desired.

In various embodiments, object detection unit 304 is arranged to recognize objects in the surrounding area of the vehicle. Object detection unit 304 is equipped with computer vision technology. It receives sensor data from various sensors of the vehicle, processes the sensor data to identify the objects, if any, in the vicinity of the vehicles. Object detection unit 304 outputs the results of its detection to autopilot engine 306 to assist autopilot engine 306 in automatically piloting the vehicle to keep the vehicle from being manually operated into an emergency situation. Object detection may be used to compute road safety zone that can be used to slow-down the vehicle and re-orient the motion vector if the control of the vehicle has been lost.

Figure 8:
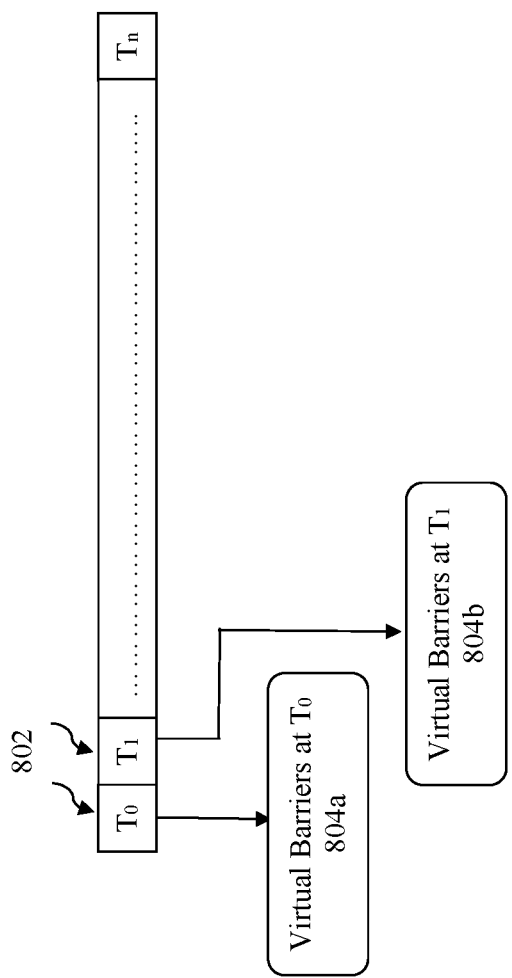
FIG. 8 illustrates determination of virtual barriers (operating guardrails) for mitigating a potential emergency.

In various embodiments, autopilot engine 306 is arranged to take actions to prevent the vehicle from being manually operated into an emergency situation. In various embodiments, autopilot engine 306 is arranged to employ a series of sliding time windows approach to incrementally return the vehicle to safe operation through a piecewise set of corrective virtual barriers (also referred to as operational guardrails or bounds). See also FIG. 8, wherein the generation of virtual barriers (operational guardrails) for a plurality of sliding time windows, is illustrated. For each "sliding timing window" 802, e.g., of a duration of 0.1 of a second (or 100 milliseconds, depending on a sampling rate configured in the driving policy where the sampling rate can be dynamically decreased or increased based on the operating parameters), autopilot engine 316 determines the one or more virtual barriers (operation guardrails) 804a-804b, based at least in part on the IV, and MV of the vehicle, and the current scene. Each set of virtual barriers (operational guardrails) 804a/804b is designed to cause corrective actions to direct the vehicle towards safer operation. For example, each virtual barrier (operational guardrail), the vehicle angular movement or speed may be gated to a threshold to minimize excessive motion by the vehicle.

As autopilot engine 306 incrementally returns the vehicle to safe operation and prevents the vehicle from being manually operated into an emergency, analysis unit 312 detects the return to safe operation, and informs mitigation unit 316 accordingly. Mitigation unit 316 in turn informs autopilot engine 306 to cease autopiloting the vehicle. In alternate embodiments, autopilot engine 306 may self-determine that autopiloting is no longer necessary.

In various embodiments, analysis unit 312, mitigation unit 316, objection detection unit 304 and autopilot engine 306 may be respectively implemented in hardware, software, or combination thereof. For hardware implementations, analysis unit 312, mitigation unit 316, objection detection unit 304 or autopilot engine 306 may be implemented with an ASIC, or a programmable circuit. For software implementations, analysis unit 312, mitigation unit 316, objection detection unit 304 and autopilot engine 306 may be implemented in any programming language that can be compiled into executable code for execution by processor cores (not shown) of ADAS 300.

Figure 4:
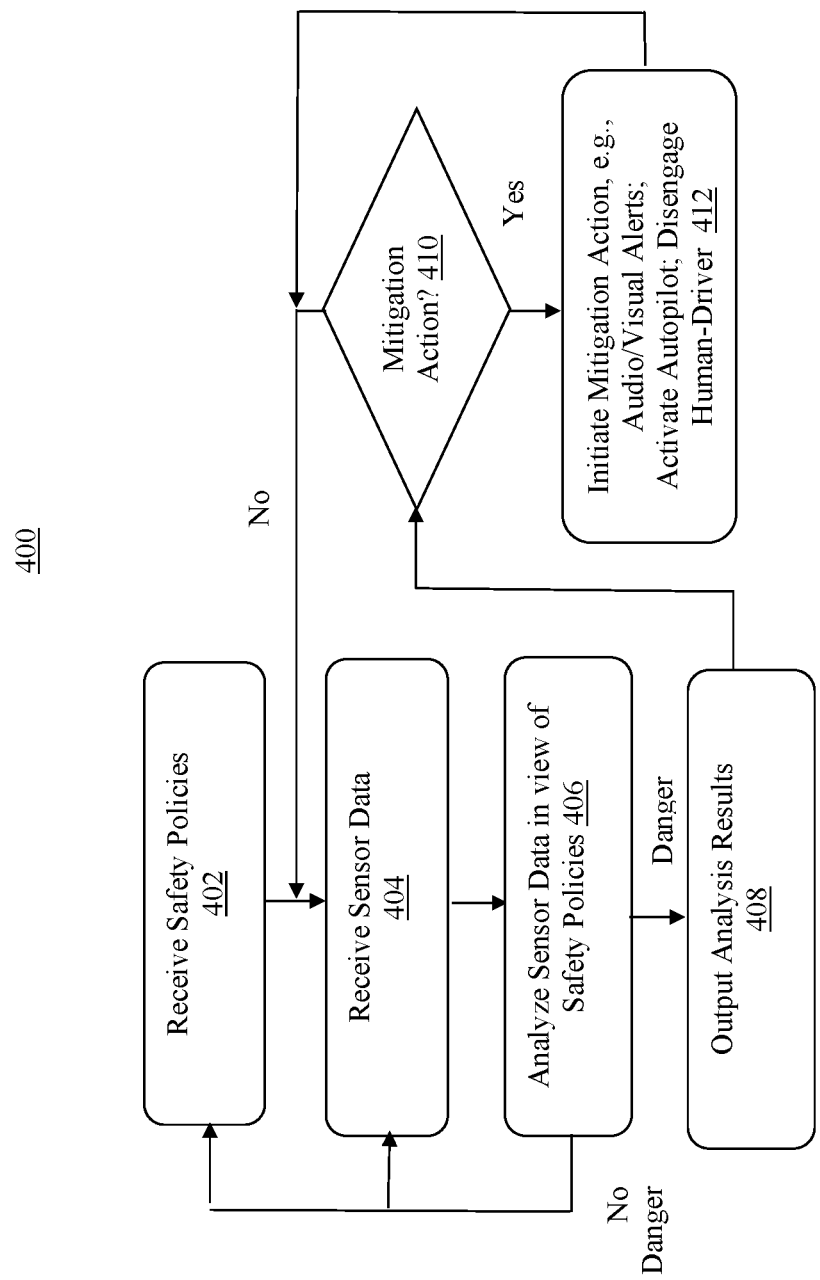
FIG. 4 illustrates an example process of automatic mitigation of a potential emergency.

Referring now to FIG. 4, wherein an example process of automatic mitigation of potential emergency, according to various embodiments, is shown. As illustrated, process 400 for automatic mitigation of potential emergency includes operations at blocks 402-412. The operations at blocks 402-408 may be performed e.g., by analysis unit 312 of FIG. 3, and the operations at blocks 410-412 may be performed e.g., by mitigation unit 316 of FIG. 3. In other embodiments, there might be more or less operations, or the operations may be performed in a different order.

Process 400 starts at block 402. At block 402, a set of safe driving policies are received, e.g., by analysis unit 312 from safety policy storage unit 324. Next, at block 404, sensor data, e.g., those about the vehicle collected by sensors of the vehicle, and those about the environmental conditions provided by remote servers or nearby vehicles, are received.

At block 406, the sensor data are analyzed in view of the safety policies. For example, as described earlier, the sensor data may be analyzed to compute the IV and the MV of the vehicle and used to determine whether one or more of the safe driving policy (specified in terms of dangerous practices) are satisfied. If no imminent danger/emergency situation is detected, process 400 returns to either block 402 or 404 and continues therefrom as earlier described. If a potential danger or emergency situation is detected, process 400 proceeds to block 408, where the results of the analysis (along with selected data, e.g., the computed IV and MV of the vehicle) are outputted.

At block 410, a determination is made on whether to initiate mitigation action to prevent the vehicle from being manually operated into a dangerous/emergency situation. As described earlier, the determination may include determination of the danger level. If a result of the determination indicates that no mitigation action is to be taken (e.g., low danger level), process 400 may return to block 404 and continue therefrom as earlier described. If a result of the determination indicates that some mitigation actions are to be taken (e.g., medium or high danger levels), process 400 may proceed to block 412 and initiate one or more mitigation actions to prevent the vehicle from being manually operated into the emergency situation. Examples of the mitigation actions in block 412 will be further described with references to FIG. 5.

Figure 5:
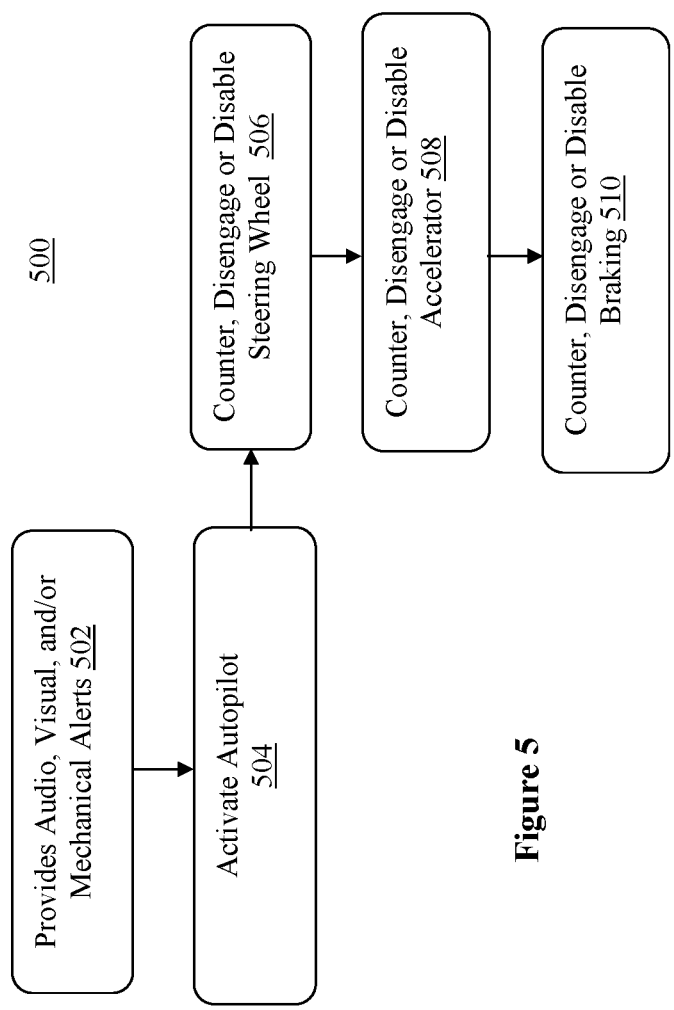
FIG. 5 illustrates an example process of mitigating human operation.

FIG. 5 illustrates an example process for taking mitigation actions, according to various embodiments. As illustrated, process 500 includes operations performed at block 502-510. The operations at blocks 502-510 may be performed by e.g., mitigation block 316 of FIG. 3. In alternate embodiments, process 500 may include more or less operations, or the operations may be performed in different order.

Process 500 starts at block 502. At block 502, one or more audio, visual and/or mechanical alerts are provided to the driver to alert the driver of the fact that the vehicle is potentially being operated manually into an emergency situation. Next at block 504, the autopilot engine of the ADAS is activated to auto pilot the vehicle momentarily to prevent the vehicle from being manually operated into the emergency situation.

At block 506, the steering wheel of the vehicle is countered, disengaged or disabled, e.g., by locking the steering wheel of the vehicle.

At block 508, the accelerator of the vehicle is countered, disengaged or disabled, e.g., by locking the accelerator of the vehicle.

At block 510, the braking of the vehicle is countered, disengaged or disabled, by locking the braking system of the vehicle.

Figures 6, 7:
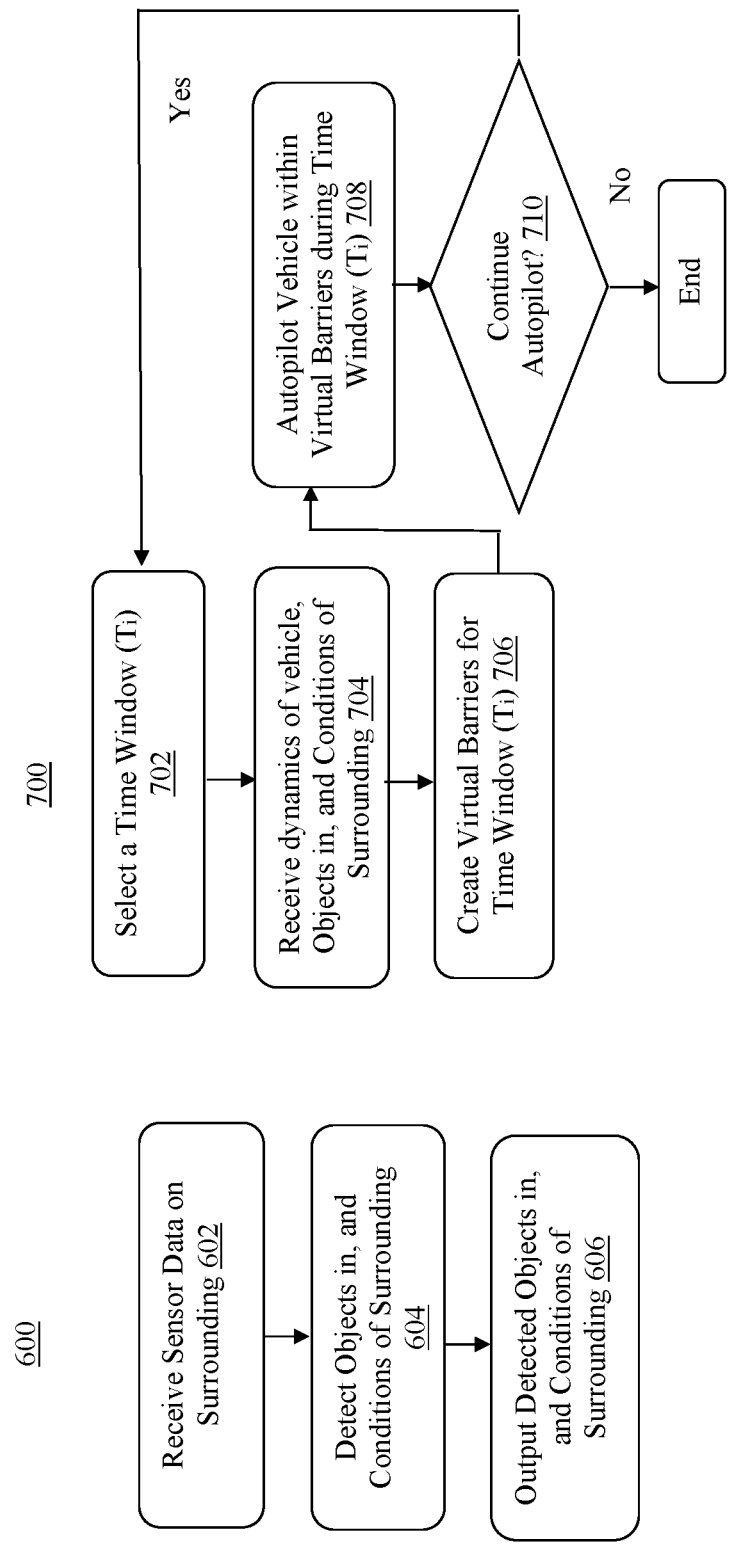
FIG. 6 illustrates an example process for object detection.
FIG. 7 illustrates an example processing for autopiloting.

Referring now to FIG. 6, wherein an example process for detecting objects, according to various embodiments, is illustrated. As shown, for the illustrated embodiments, process 600 includes operations performed at blocks 602-606. The operations at blocks 602-606 may be performed e.g., by object detection unit 304 of FIG. 3. In alternate embodiments, process 600 may have more or less operations or the operations may be performed in different order.

Process 600 starts at block 602. At block 602, sensor data on the immediate surrounding of the vehicle are received. The sensor data may be collected, e.g., by sensors of the vehicle. At block 604, objects in, such as, another vehicle, pedestrians, bicyclists, trees, street signs, and so forth, and conditions of the surrounding, such as dry, wet, raining, or snowing, may be detected. The detection may be performed in any one of a number of manners known in the art. In various embodiments, object detections may be performed through machine learning, using one or more neural networks. An example neural network is further described below with references to FIG. 9. Next, at block 606, objects detected and/or conditions of the vehicle's surrounding may be outputted, Referring now to FIG. 7, wherein an example process for autopiloting a vehicle, according to various embodiments, is illustrated. As shown, process 700 for autopiloting a vehicle include operations performed at blocks 702-710. The operations at blocks 702-710 may be performed e.g., by autopilot engine 306 of FIG. 3. In alternate embodiments, process 700 may have more or less operations or the operations may be performed in different order.

Process 700 starts at block 702. At block 702, a next sliding time window ($T_i$) is selected. Next at block 704, real time determined/detected dynamics of the vehicle, such as its IV and MV, as well as objects in, and conditions of the immediate surrounding of the vehicles are received. At block 706, one or more virtual barriers (operational guardrails) are determined for the sliding time window ($T_i$), as earlier described.

At block 708, the vehicle is autopiloted during the sliding time window ($T_i$), within the virtual barriers (operational guardrails) determined for the sliding time window ($T_i$). One or more commands may be issued to the DCU of the vehicle, if necessary, to bring the vehicle to operate within the virtual barriers (operational guardrails), thereby incrementally return the vehicle to safe operation.

At block 710, a determination is made on whether to continue to autopilot the vehicle. The determination may review the analysis result of assessing whether the vehicle has been brought back to safe operation. If the analysis result indicates the vehicle has not been fully brought back to safe operation, process 700 may return to block 702, and continues therefrom as earlier described. If the analysis result indicates the vehicle has been fully brought back to safe operation, process 700 may end.

Figure 9:
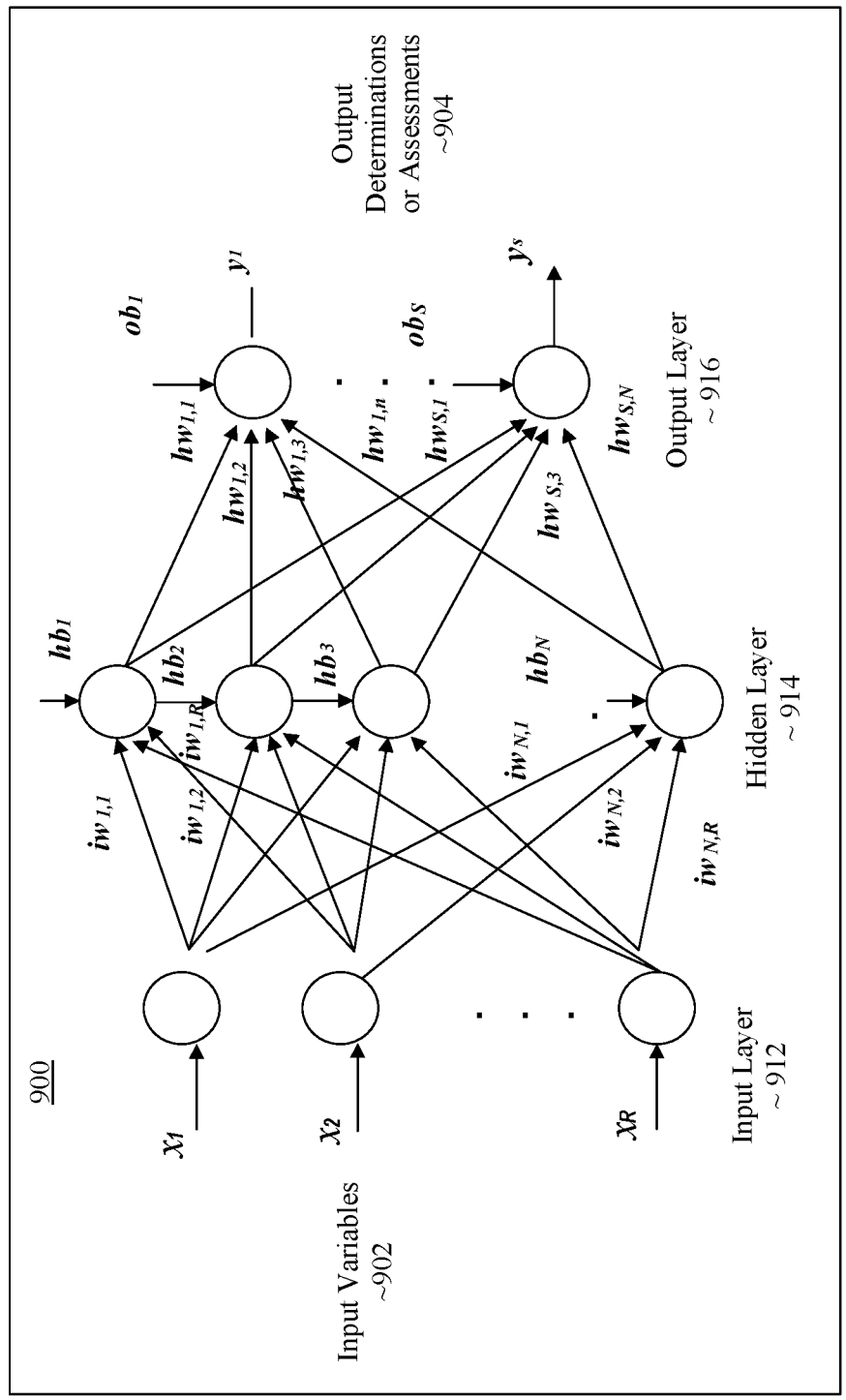
FIG. 9 illustrates an example neural network suitable for use by an ADAS.

Referring now to FIG. 9, wherein an example neural network suitable for use e.g., to detect objects in the immediate surrounding of the vehicle, in accordance with various embodiments, is shown. Example neural network 900 may be suitable for use by object detection unit 304 of FIG. 3. As shown, example neural network 900 may be a multilayer feedforward neural network (FNN) comprising an input layer 912, one or more hidden layers 914 and an output layer 916. Input layer 912 receives data of input variables ($x_i$) 902. Hidden layer(s) 914 processes the inputs, and eventually, output layer 916 outputs the determinations or assessments ($y_i$) 904. In one example implementation the input variables ($x_i$) 902 of the neural network are set as a vector containing the relevant variable data, while the output determination or assessment ($y_i$) 904 of the neural network are also as a vector. In some examples, the FNN may be expressed through the following equations:

$$ho_i = f\left(\sum_{j=1}^{R} (iw_{i,j} x_j) + hb_i\right), \text{ for } i = 1, \ldots, N$$

$$y_i = f\left(\sum_{k=1}^{N} (hw_{i,k} ho_k) + ob_i\right), \text{ for } i = 1, \ldots, S$$

In the above equations, $ho_i$ and $y_i$ are the hidden layer variables and the final outputs, respectively; $f()$ is a non-linear function, such as the sigmoid function or rectified linear (ReLu) function that mimics the neurons of the human brain; R is the number of inputs; N is the size of the hidden layer, or the number of neurons; and S is the number of the outputs.

A goal of the FNN is to minimize an error function E between the network outputs and the desired targets, by adapting the network variables iw, hw, hb, and ob, via training, as follows:

$$E = \sum_{k=1}^{m} (E_k), \text{ where } E_k = \sum_{p=1}^{s} (t_{kp} - y_{kp})^2$$

In the above equations, $y_{kp}$ and $t_{kp}$ are the predicted and the target values of pth output unit for sample k, respectively, and m is the number of samples.

For object detection unit 304 of FIG. 3, input variables ($x_i$) 902 may include various sensor data collected by various vehicles sensors, as well as environmental data of the surrounding provided by remote servers and/or nearby vehicles. The output variables ($y_i$) 904 may include the detected objects, such as nearby vehicles, pedestrians, bicyclists, trees, street signs, and so forth. The network variables of the hidden layer(s) for the neural network of X, are determined by the training data.

In the example of FIG. 9, for simplicity of illustration, there is only one hidden layer in the neural network. In some other embodiments, there can be many hidden layers. Furthermore, the neural network can be in some other types of topology, such as Convolution Neural Network (CNN), Recurrent Neural Network (RNN), and so forth.

Figure 10:
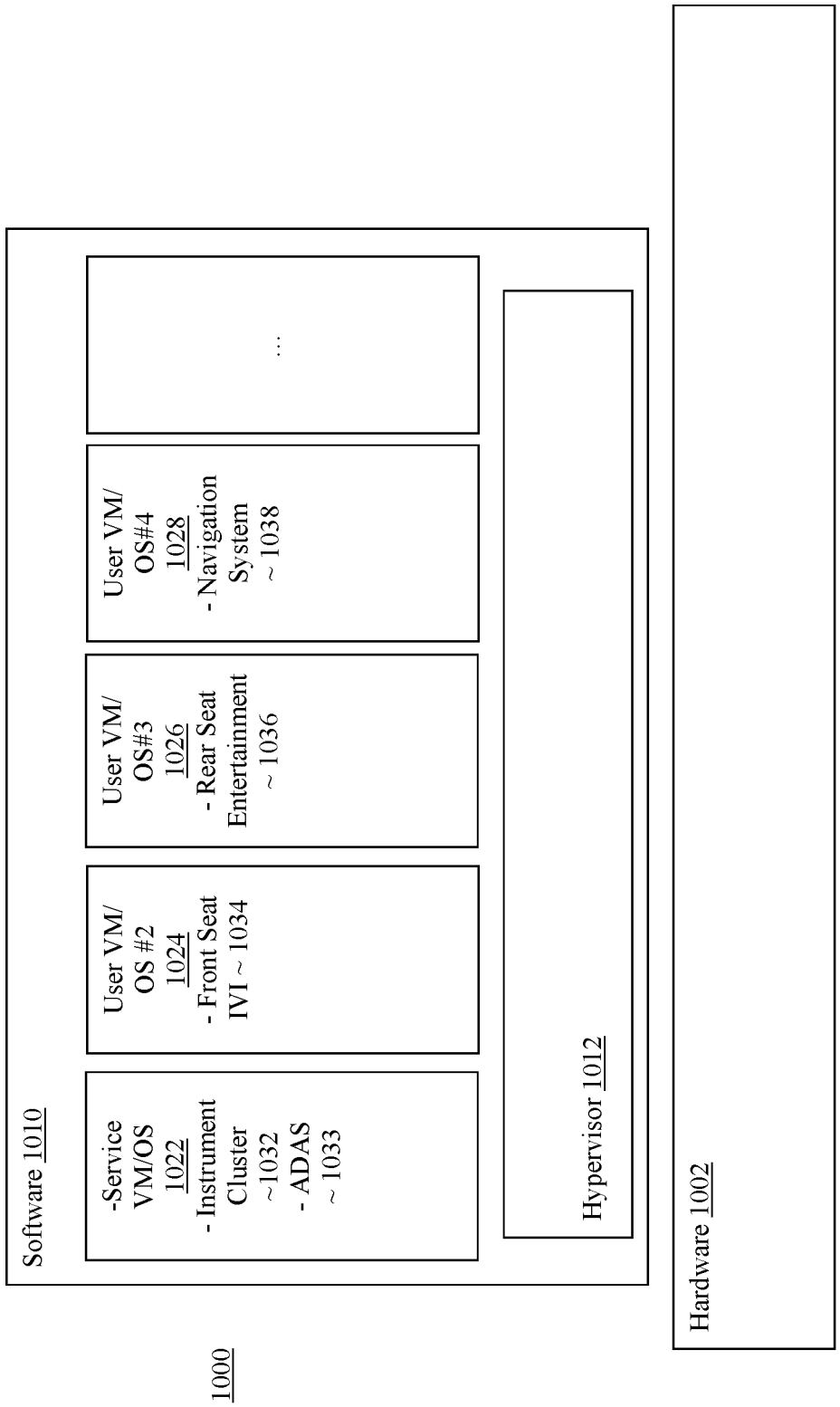
FIG. 10 illustrates a software component view of an in-vehicle system.

Referring now to FIG. 10, wherein a software component view of the in-vehicle system, according to various embodiments, is illustrated. As shown, for the embodiments, IVS system 1000, which could be IVS system 100, includes hardware 1002 and software 1010. Software 1010 includes hypervisor 1012 hosting a number of virtual machines (VMs) 1022-1028. Hypervisor 1012 is configured to host execution of VMs 1022-1028. The VMs 1022-1028 include a service VM 1022 and a number of user VMs 1024-1028. Service machine 1022 includes a service OS hosting execution of a number of instrument cluster applications 1032 and an ADAS 1033, e.g., ADAS 130 of FIG. 1 or 200 of FIG. 2, incorporated with the emergency mitigation technology of the present disclosure. User VMs 1024-1028 may include a first user VM 1024 having a first user OS hosting execution of front seat infotainment applications 1034, a second user VM 1026 having a second user OS hosting execution of rear seat infotainment applications 1036, a third user VM 1028 having a third user OS hosting execution of navigation subsystem 1038, and so forth.

Except for the emergency mitigation technology of the present disclosure incorporated, elements 1012-1038 of software 1010 may be any one of a number of these elements known in the art. For example, hypervisor 1012 may be any one of a number of hypervisors known in the art, such as KVM, an open source hypervisor, Xen, available from Citrix Inc, of Fort Lauderdale, FL., or VMware, available from VMware Inc of Palo Alto, CA, and so forth. Similarly, service OS of service VM 1022 and user OS of user VMs 1024-1028 may be any one of a number of OS known in the art, such as Linux, available e.g., from Red Hat Enterprise of Raleigh, NC, or Android, available from Google of Mountain View, CA.

Figure 11:
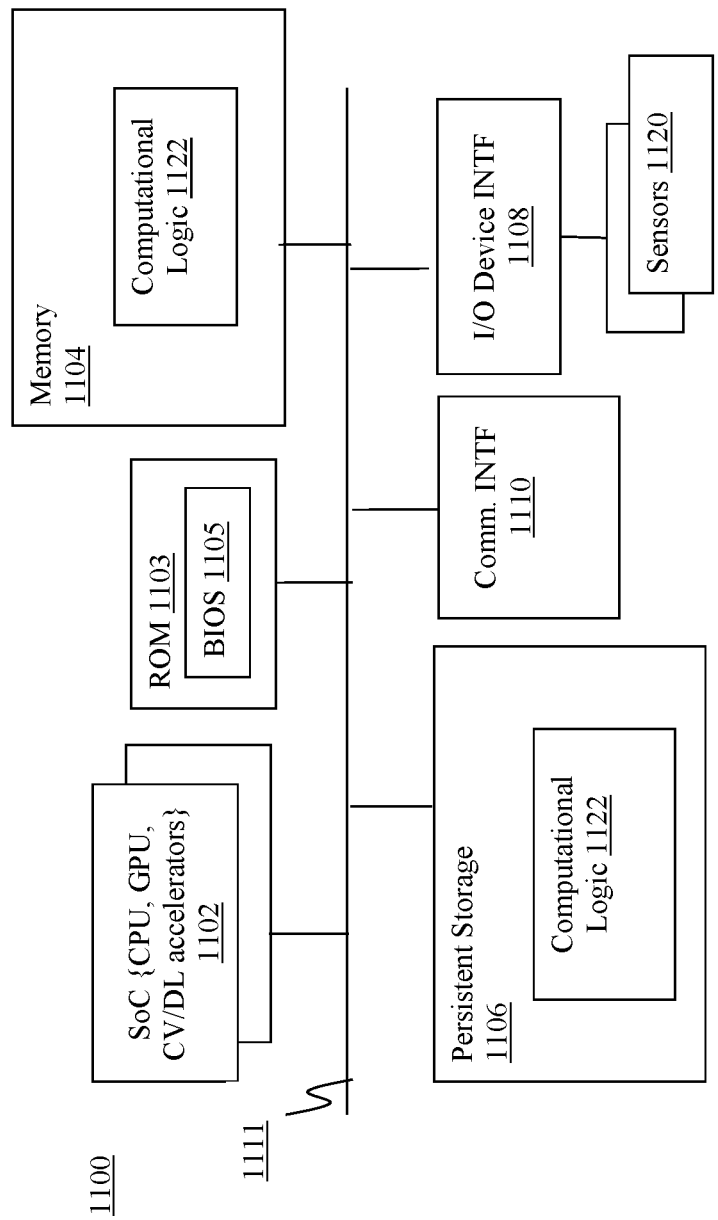
FIG. 11 illustrates a hardware component view of a computer platform, suitable for use as an in-vehicle system or a cloud server.

Referring now to FIG. 11, wherein an example computing platform that may be suitable for use to practice the present disclosure, according to various embodiments, is illustrated. As shown, computing platform 1100, which may be hardware 1002 of FIG. 10, or a computing platform of one of the servers 60 of FIG. 1, include one or more system-on-chips (SoCs) 1102, ROM 1103 and system memory 1104. Each SoCs 1102 may include one or more processor cores (CPUs), one or more graphics processor units (GPUs), one or more accelerators, such as computer vision (CV) and/or deep learning (DL) accelerators. ROM 1103 may include basic input/output system services (BIOS) 1105. CPUs, GPUs, and CV/DL accelerators may be any one of a number of these elements known in the art. Similarly, ROM 1103 and BIOS 1105 may be any one of a number of ROM and BIOS known in the art, and system memory 1104 may be any one of a number of volatile storage devices known in the art.

Additionally, computing platform 1100 may include persistent storage devices 1106. Example of persistent storage devices 1106 may include, but are not limited to, flash drives, hard drives, compact disc read-only memory (CD-ROM) and so forth. Further, computing platform 1100 may include one or more input/output (I/O) interfaces 1108 to interface with one or more I/O devices, such as sensors 1120. Other example I/O devices may include, but are not limited to, display, keyboard, cursor control and so forth. Computing platform 1100 may also include one or more communication interfaces 1110 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 1111, which may represent one or more buses. In the case of multiple buses, they may be bridged by one or more bus bridges (not shown).

Each of these elements may perform its conventional functions known in the art. In particular, ROM 1103 may include BIOS 1105 having a boot loader. System memory 1104 and mass storage devices 1106 may be employed to store a working copy and a permanent copy of the programming instructions implementing the operations associated with hypervisor 112, service/user OS of service/user VM 1022-1028, or components of ADAS 1033, collectively referred to as computational logic 922. The various elements may be implemented by assembler instructions supported by processor core(s) of SoCs 1102 or high-level languages, such as, for example, C, that can be compiled into such instructions.

Figure 12:
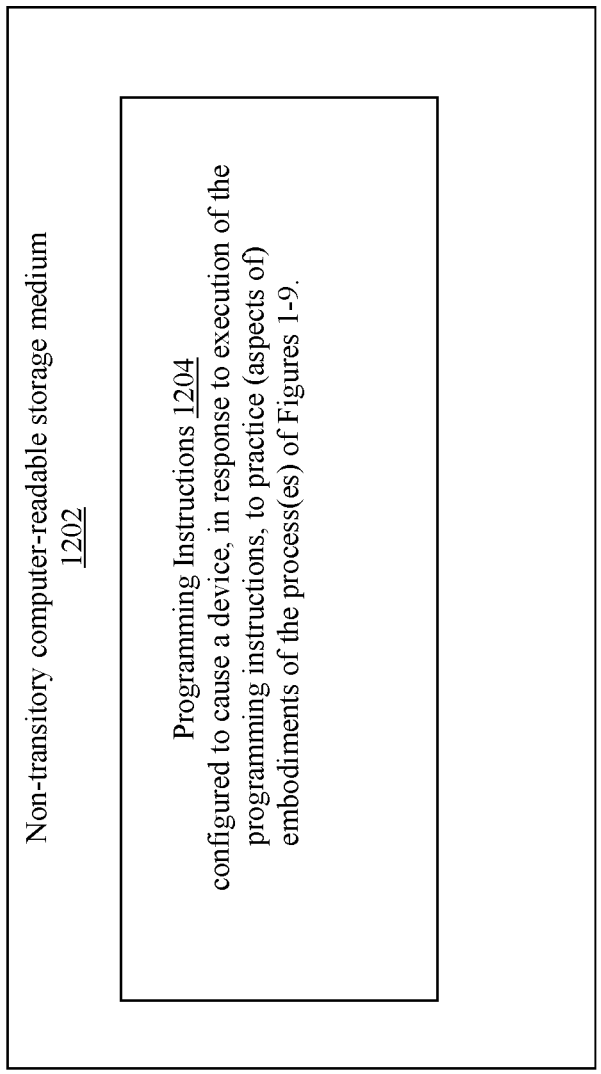
FIG. 12 illustrates a storage medium having instructions for practicing methods described with references to FIGS. 1-8.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 12 illustrates an example computer-readable non-transitory storage medium that may be suitable for use to store instructions that cause an apparatus, in response to execution of the instructions by the apparatus, to practice selected aspects of the present disclosure described with references to FIGS. 1-8. As shown, non-transitory computer-readable storage medium 1202 may include a number of programming instructions 1204. Programming instructions 1204 may be configured to enable a device, e.g., computing platform 1100, in response to execution of the programming instructions, to implement (aspects of) hypervisor 1012, service/user OS of service/user VM 1022-1028, or components of ADAS 130, 200, or 1033. In alternate embodiments, programming instructions 1204 may be disposed on multiple computer-readable non-transitory storage media 1202 instead. In still other embodiments, programming instructions 1204 may be disposed on computer-readable transitory storage media 1202, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and descriptions, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 includes an apparatus for computer-assisted driving (CAD), comprising: an autopilot engine disposed in a vehicle to automatically pilot the vehicle out of a potential emergency situation, wherein to automatically pilot the vehicle out of the potential emergency situation includes to automatically pilot the vehicle for a period of time in view of a plurality of operational guardrails determined in real time for each of a plurality of timing windows; and a mitigation unit disposed in the vehicle and coupled to the autopilot engine to conditionally activate the autopilot engine, wherein to conditionally activate the autopilot engine includes to activate the autopilot engine in response to analysis results indicative of the vehicle being potentially operated into the emergency situation manually.

Example 2 includes the apparatus of example 1, wherein to automatically pilot the vehicle for a period of time in view of a plurality of operational guardrails includes to determine in real time the one or more operational guardrails for each of the plurality of timing windows.

Example 3 includes the apparatus of example 2, wherein to determine in real time the one or more operational guardrails for a timing window includes to determine in real time the one or more operational guardrails for the timing window, based at least in part on dynamics of the vehicle determined in real time.

Example 4 includes the apparatus of example 3, wherein the dynamics of the vehicle determined in real time includes a current inertial vector of the vehicle, and a current motion vector of the vehicle.

Example 5 includes the apparatus of example 2, wherein to automatically pilot the vehicle for a period of time in view of a plurality of operational guardrails includes to issue commands to a device control unit (DCU) of the vehicle to moderate operating characteristics of the vehicle to within the plurality of operational guardrails determined for each of the plurality of timing windows.

Example 6 includes the apparatus of example 1, wherein the mitigation unit is to further counter, disengage or disable manual operation of the vehicle, including to counter, disengage or disable one or more of manual steering, acceleration or braking of the vehicle.

Example 7 includes the apparatus of example 1, wherein the mitigation unit is to further provide one or more audio or visual alerts to a driver of the vehicle about a current assessment of a driver assistance system having the autopilot engine and the mitigation unit, with respect to a current potential of the vehicle being manually operated into the emergency situation.

Example 8 includes the apparatus of example 7, wherein to provide one or more audio or visual alert includes to provide a visual indicator that visually depicts the current assessment of the current potentiality on a potential gradient of the vehicle being manually operated into the emergency.

Example 9 includes the apparatus of any one of examples 1-8 further comprising: a safety policy storage unit disposed in the vehicle to store a plurality of safe driving policies; and an analysis unit disposed in the vehicle and coupled to the safety policy storage unit and the mitigation unit, to determine a current potential of the vehicle being operated manually into the emergency situation; wherein to determine the current potentiality, the analysis unit is arranged to receive sensor data from various sensors, and analyze the sensor data in view of the stored safe driving policies.

Example 10 includes the apparatus of example 9, wherein to analyze the sensor data in view of the stored safe driving policies, the analysis unit is arranged to determine a current inertial vector of the vehicle and a current motion vector of the vehicle, based at least in part on the sensor data, and determine whether there are any violations of the safe driving policies, based at least in part on the current inertial vector of the vehicle and the current motion vector of the vehicle determined.

Example 11 includes the apparatus of examples 1-10, wherein the emergency situation includes a selected one of the vehicle being driven off the road, the vehicle being driven into another vehicle, or the vehicle being driven into a person or object.

Example 12 includes a method for computer-assisted driving, comprising: receiving, by a driving assistance subsystem (DAS) of a vehicle, analysis results indicating of a potential of the vehicle being manually operated into an emergency situation, in excess of a threshold; automatic piloting, by the DAS unit, for a period of time to prevent the vehicle from being operated manually into the emergency situation; and countering, disengaging, or disabling, by the DAS, manual operation of the vehicle, while the vehicle is momentarily being automatically piloted.

Example 13 includes the method of example 12, wherein countering, disengaging, or disabling comprises countering, disengaging, or disabling one or more of steering, accelerating or braking of the vehicle.

Example 14 includes the method of examples 12-13, further comprising: receiving, by the DAS, sensor data from various sensors; and analyzing, by the DAS, the sensor data in view of safe driving policies stored in the vehicle, to determine a current potential of the vehicle being operated manually into an emergency situation.

Example 15 includes the method of example 14, wherein analyzing comprises determining, by the DAS, a current inertial vector of the vehicle and a current motion vector of the vehicle, based at least in part on the sensor data, and determining whether there are any violations of the safe driving policies stored in the vehicle, based at least in part on the current inertial vector of the vehicle and the current motion vector of the vehicle determined.

Example 16 includes the method of examples 12-15, wherein the emergency situation includes a selected one of the vehicle being driven off the road, the vehicle being driven into another vehicle, or the vehicle being driven into a person or object.

Example 17 includes at least one computer-readable medium (CRM) having instructions stored therein, to cause a driver assistance system (DAS) of a vehicle, in response to execution of the instruction by the DAS, to: determine one or more operational guardrails, based at least in part on dynamics of the vehicle determined in real time; and automatically pilot the vehicle for a period of time, in view of the one or more operational guardrails determined, to deter the vehicle from being operated manually into an emergency situation.

Example 18 includes the CRM of example 17, wherein the one or more operational guidelines are determined in each of a plurality of timing windows, and the vehicle is automatically piloted in each of a plurality of timing windows based at least in part on the corresponding plurality of operational guidelines determined.

Example 19 includes the CRM example 17, wherein the DAS is further caused to determine in real time the dynamics of the vehicle including determination in real time, a current inertial vector of the vehicle, and a current vector of motion of the vehicle; wherein determination of the one or more operational guardrails is based at least in part on the current inertial vector of the vehicle, and the current vector of motion of the vehicle.

Example 20 includes the CRM example 17, wherein to automatically pilot the vehicle momentarily in view of a plurality of operational guardrails includes to issue commands to a device control unit (DCU) of the vehicle to moderate operating characteristics of the vehicle to within the plurality of operational guardrails.

Example 21 includes the CRM of examples 17-20, wherein the DAS is further caused to receive sensor data from various sensors; analyze the sensor data in view of safe driving policies stored in the vehicle, to determine a current potential of the vehicle being operated manually into an emergency situation.

Example 22 includes the CRM of examples 17-21, wherein to analyze comprises to determine a current inertial vector of the vehicle and a current motion vector of the vehicle, based at least in part on the sensor data, and to determine whether there are any violations of the safe driving policies stored in the vehicle, based at least in part on the current inertial vector of the vehicle and the current motion vector of the vehicle determined.

Example 23 includes the CRM of examples 17-22, wherein the emergency situation includes a selected one of the vehicle being driven off the road, the vehicle being driven into another vehicle, or the vehicle being driven into a person or object.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. An apparatus for computer-assisted driving (CAD) disposed in a vehicle, the apparatus comprising:
autopilot circuitry to: generate, in real time, one or more virtual guardrails for respective sliding timing windows, and automatically pilot the vehicle within the one or more virtual guardrails during the respective sliding timing windows to incrementally guide maneuvers of the vehicle through an environment during the respective sliding timing windows in order to bring the vehicle into safe operation where a plurality of safe driving policies are not violated;
mitigation circuitry coupled to the autopilot circuitry to conditionally activate the autopilot circuitry in response to an analysis result indicative of the vehicle being potentially operated into an emergency situation manually; and
analysis circuitry coupled to the autopilot circuitry or the mitigation circuitry, the analysis circuitry is to:
analyze whether a plurality of sensor data of the vehicle indicate whether the vehicle is being manually operated unsafely in violation of one or more safe driving policies of the plurality of safe driving policies, the plurality of safe driving policies specifying a plurality of unsafe driving behaviors, and
in response to a determination of a violation of the one or more safe driving policies, generate the analysis result indicative of the vehicle being potentially operated into the emergency situation manually.

2. The apparatus of claim 1, wherein to automatically pilot the vehicle within the one or more virtual guardrails includes to determine in real time one or more of the one or more virtual guardrails for each of a plurality of sliding timing windows including the respective sliding timing windows.

3. The apparatus of claim 2, wherein to determine in real time the one or more of the one or more virtual guardrails for one of the plurality of sliding timing windows includes to determine in real time the one or more of the one or more virtual guardrails for the respective sliding timing windows, based at least in part on dynamics of the vehicle determined in real time.

4. The apparatus of claim 3, wherein the dynamics of the vehicle determined in real time include a current inertial vector of the vehicle and a current motion vector of the vehicle.

5. The apparatus of claim 2, wherein, to automatically pilot the vehicle within the one or more virtual guardrails, the autopilot circuitry is to further issue commands to a device control unit (DCU) of the vehicle to moderate operating characteristics of the vehicle to within the one or more virtual guardrails determined for the plurality of sliding timing windows.

6. The apparatus of claim 1, wherein the mitigation circuitry is to further counter, disengage, or disable manual operation of the vehicle, including to counter, disengage, or disable one or more of manual steering, acceleration, or braking of the vehicle.

7. The apparatus of claim 1, wherein the mitigation circuitry is to further provide one or more audio or visual alerts to a driver of the vehicle about a current assessment of a driver assistance system having the autopilot circuitry and the mitigation circuitry, with respect to a current potential of the vehicle being manually operated into the emergency situation.

8. The apparatus of claim 7, wherein to provide the one or more audio or visual alerts includes to provide a visual indicator that visually depicts the current assessment of the current potential on a potential gradient of the vehicle being manually operated into the emergency situation.

9. The apparatus of claim 1, further comprising: storage circuitry disposed in the vehicle and coupled to the analysis circuitry, wherein the storage circuitry is arranged to store the plurality of safe driving policies specifying the plurality of unsafe driving behaviors.

10. The apparatus of claim 1, wherein, to analyze whether the sensor data indicate the vehicle is being manually operated unsafely in violation of the one or more safe driving policies, the analysis circuitry is to further:
  determine a current inertial vector of the vehicle and a current motion vector of the vehicle based at least in part on the sensor data; and
  determine whether there are any violations of the one or more safe driving policies, based at least in part on the current inertial vector of the vehicle and the current motion vector of the vehicle.

11. The apparatus of claim 1, wherein the emergency situation includes a selected one of the vehicle being driven off a road, the vehicle being driven into another vehicle, or the vehicle being driven into a person or an object.

12. At least one non-transitory computer-readable medium (CRM) comprising instructions, wherein execution of the instructions by a driver assistance system (DAS) in a vehicle is to cause the DAS to:
  analyze a plurality of sensor data of the vehicle and determine the vehicle is being manually operated in violation of one or more safe driving policies of a plurality of safe driving policies, and therefore the vehicle is being potentially operated manually into an emergency situation, the plurality of safe driving policies specifying a plurality of unsafe driving behaviors;
  determine one or more virtual guardrails in real time, based at least in part on dynamics of the vehicle determined in real time, for respective sliding timing windows; and
  automatically pilot the vehicle within the one or more virtual guardrails during the respective sliding timing windows to incrementally guide maneuvers of the vehicle through an environment during the respective sliding timing windows in order to bring the vehicle back into safe operation, where the one or more safe driving policies are not violated, to deter the vehicle from being operated manually into the emergency situation.

13. The non-transitory CRM of claim 12, wherein one or more of the one or more virtual guardrails are determined for each of a plurality of sliding timing windows including the respective sliding timing windows, and the vehicle is automatically piloted in each of the plurality of sliding timing windows based at least in part on the corresponding one or more virtual guardrails determined.

14. The non-transitory CRM of claim 12, wherein execution of the instructions is to further cause the DAS to: determine in real time the dynamics of the vehicle including determining, in real time, a current inertial vector of the vehicle and a current motion vector of the vehicle, wherein determination of the one or more virtual guardrails is based at least in part on the current inertial vector of the vehicle and the current motion vector of the vehicle.

15. The non-transitory CRM of claim 12, wherein, to automatically pilot the vehicle momentarily within the one or more virtual guardrails, execution of the instructions is to cause the DAS to: issue commands to a device control unit (DCU) of the vehicle to moderate operating characteristics of the vehicle to within the one or more virtual guardrails.

16. The non-transitory CRM of claim 12, wherein execution of the instructions is to further cause the DAS to: receive the plurality of sensor data from one or more sensors.

17. The non-transitory CRM of claim 16, wherein, to analyze the plurality of sensor data, execution of the instructions is to further cause the DAS to:
  determine a current inertial vector of the vehicle and a current motion vector of the vehicle based at least in part on the plurality of sensor data; and
  determine whether there are any violations of the one or more safe driving policies based at least in part on the current inertial vector of the vehicle and the current motion vector of the vehicle.

* * * * *